United States Patent Office 3,005,547
Patented Oct. 24, 1961

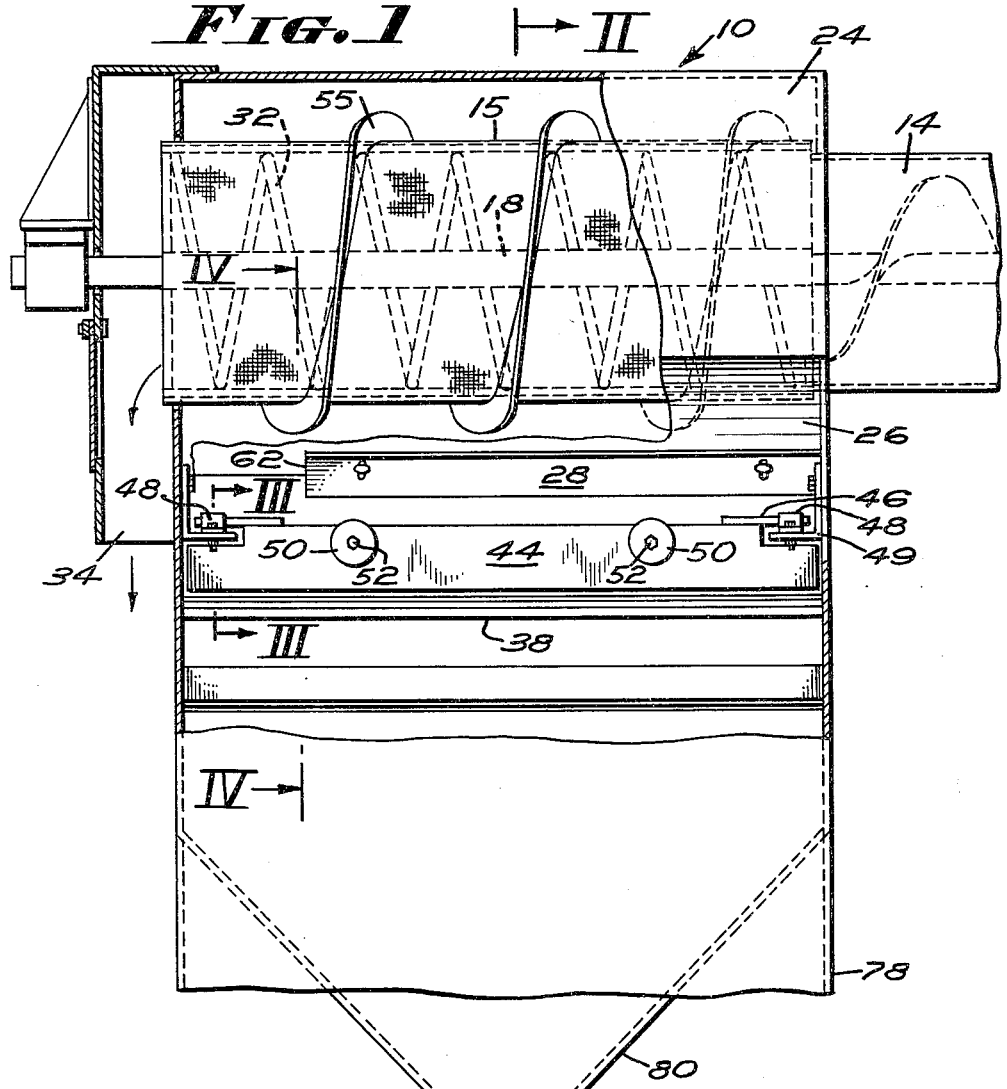
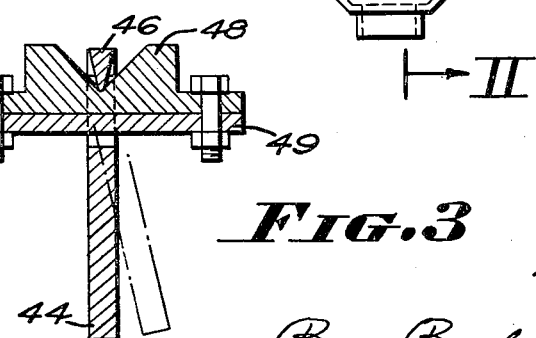

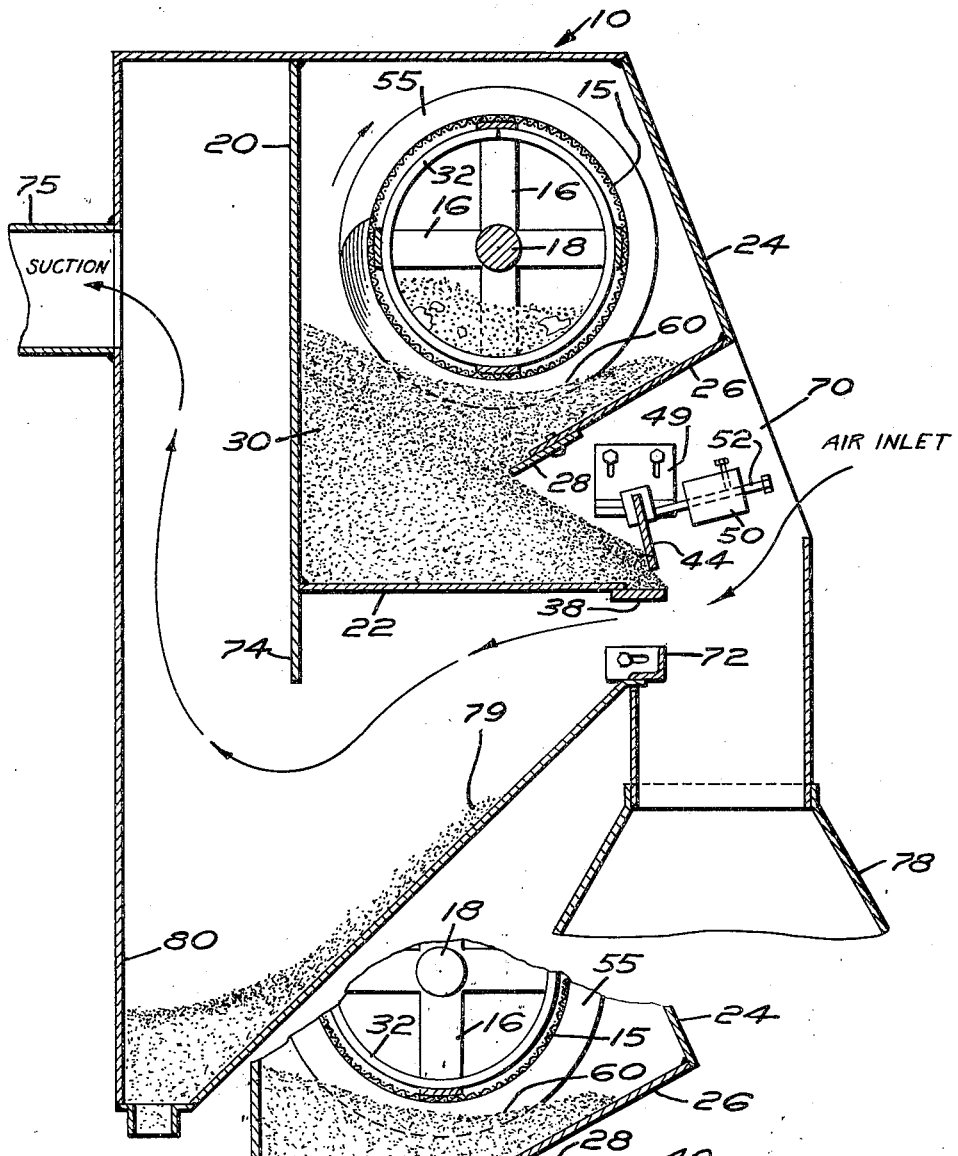
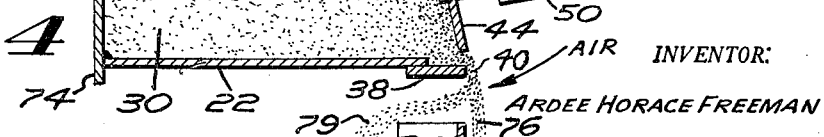

3,005,547
SEPARATOR FOR PARTICULATE MATERIALS
Ardee Horace Freeman, Granger, Ind., assignor, by mesne assignments, to Bell Intercontinental Corporation, South Bend, Ind., a corporation of Delaware
Filed Nov. 13, 1959, Ser. No. 852,812
10 Claims. (Cl. 209—32)

This invention relates to an improved device for separating particulate materials, such as dust from abrasive granules; and more particularly to an improved device for abstracting fine contaminants from reusable blast media, such as shot, grit, abrasive granules and the like such as are used in connection with apparatus for cleaning or otherwise surface finishing castings and/or other semi-finished products.

Blast media such as used in surface finishing or cleaning processes on forgings, castings, or other such items are propelled at the workpieces at high velocity, and the blast media gradually breaks down into fine particles such as are no longer efficient for abrasive purposes. Also, incidental to such operations, foreign materials such as sand, scale, rust and dust are removed from the items being processed and become intermixed with the abrasive. The machine of the present invention is particularly adapted to separate reusable abrasive particles from mixtures thereof with undesirable, fine abrasive dust and other foreign matter; and it is an object of the present invention to provide an improved separator for classifying mixtures as aforesaid by passing them across an air stream.

Another object is to provide an improved separator as aforesaid which employs an air stream for separating the reusable abrasive from mixtures thereof with contaminants; the device being automatically self-adjusting at all times to optimum operating condition notwithstanding substantial variances in the load feed rate.

Another object is to provide a device as aforesaid which is of compact structural form, and which has a high flow capacity, and which provides at all times an accurately adjusted and uniform feed flow pattern along the entire length of the air gap.

Another object is to provide a device as aforesaid which is not subject to blockages of the abrasive media flow, and which is otherwise foolproof in operation.

Other objects and advantages of the invention will appear from the specification hereinafter wherein:

FIG. 1 is a side elevational view of a machine of the invention with portions broken away to show the interior;

FIG. 2 is a section taken on line II—II of FIG. 1, showing the machine in inoperative condition;

FIG. 3 is a fragmentary section taken on line III—III of FIG. 1; and

FIG. 4 is a fragmentary section corresponding to FIG. 3 but taken on line IV—IV of FIG. 1 and showing the machine in operating condition.

As shown in the drawing herewith, a machine of the invention may be constructed to comprise a box-like casing 10 which is mounted upon any suitable support and is provided with an opening at one end to receive a feed supply from any suitable device such as a screw conveyor as shown at 14 (FIG. 1). Interiorly of the casing 10 and directionally in line with the conveyor 14 is disposed a cylindrical screen 15 carried by radial spokes 16 (FIG. 2) extending from a generally horizontally disposed drive shaft 18.

The drive shaft 18 is supported at its opposite ends on bearing devices, and is arranged to be power-driven to rotate the screen 15 either coincident with rotation of the feed screw conveyor 14 or independently thereof, as may be preferred.

The casing structure 10 includes a back plate 20 and a bottom plate 22, as well as a front plate 24 and an inclined feed control plate 26, upon the lower edge of which is adjustably positioned a control gate plate 28. The above recited plate portions of the casing are so dimensioned and arranged as to substantially enclose the horizontally disposed rotating screen 15, while providing therebelow a hopper space into which material passing through the interstices of the screen 15 may fall as indicated at 30. Interiorly of the screen 15, and adjacent the inner periphery thereof is disposed a spirally shaped flight device 32 constructed of a suitably bent metal strip or rod or the like. Hence, upon rotation of the screen any oversize debris or the like such as may have found its way into the feed material will be "scalped" off and delivered by the helical flight device 32 to the left hand open end portion of the screen 15 whereupon it will fall through a debris chute as indicated at 34 in FIG. 1, for convenient disposal.

The openings of the screen 15 are sized so as to pass any reusable abrasive material as explained hereinabove, as well as the finer abrasive material and/or contaminants occurring in the feed material; and thus this mixture will fall through the screen openings and accumulate in the hopper structure as indicated at 30 in FIGS. 2–4. Particular attention is called to the fact that the adjustable feed control gate plate 28 is set to permit material from the accumulation 30 to flow at its natural angle of repose from below the bottom edge of the control plate 28 over the open lip portion of the bottom plate 22. A supplementary spill plate 38 is preferably provided at the open edge of the bottom plate 22 to receive the wear thereon occasioned by flowing of abrasive material over the edge thereof as will be explained hereinafter.

Further to control flow of material over the open edge of the plate 38, there is provided a movable gate plate 44 which is supported by hinges 46, 46 at its opposite ends resting in bearings 48 (FIGS. 1, 3) carried by brackets 49 supported on the opposite end walls of the casing structure 10. Thus as shown in FIG. 3 the control gate 44 naturally tends to hang vertically downwardly, but is freely rockable on the bearings 48, 48 and is so disposed as to tend to block flow of material 30 from under the fixed gate plate 28 over the spill plate 38. However, pressure of material accumulations against the backside of the plate 44 will tend to swing it toward open position, and counterweights 50 mounted upon arms 52 extending rigidly from the control plate and are positionally adjustable thereon whereby to permit control of the thickness of the curtain of material which is allowed to flow over the spill plate 38.

It is another particular feature of the present invention that a helical flight device as indicated at 55 is mounted about the outer surface of the screen 50 so as to extend from one end thereof to another; the ribbon device 55 being pitched so that as the screen 15 revolves the bottom edges of the ribbon device operate to "shovel" the top of the pile of the material as indicated at 60 (FIGS. 2, 4) which has accumulated within the hopper structure, in the lengthwise direction of the screen device thereby maintaining the top of the material accumulation in substantially level form. Or, in lieu of the screen and ribbon device as described herein, any other suitable means for "shoveling" the feed material lengthwise of the gate plate 28, such as a simple screw conveyor, may be employed.

The primary purpose of the device of the invention is to provide means operable automatically to insure that the curtain of falling material as indicated at 40 is of uniform thickness throughout the extent of the spill plate 38; that is, from the right hand end to the left hand end thereof as viewed in FIG. 1. It is a particular feature of the arrangement that the movable gate plate 44 extends throughout the length of the spill plate 38, while the gate plate 28 extends only from the feed end of the machine to a position short of the opposite end thereof as indicated at 62 (FIG. 1). The parts are so dimensioned and arranged that as long as the feed material backs up behind and escapes only beneath the fixed gate plate 28 and thence against the movable plate 44 as shown in FIG. 2, it will not be of sufficient weight against the plate 44 to overcome the forces of the counter-weights 50—50 so as to "open" the gate plate 44.

However, as the screw conveyor 14 continues to feed material into the screen 15, and the spiral ribbon 55 thereof continues to shovel the material toward the left hand end of the machine as viewed in FIG. 1, the material finally reaches the end of the fixed gate plate 28 and thereupon pours through the opening beyond the end portion 62 thereof and then flows downwardly against the left hand end portion of the movable gate plate 44. This imposes a substantially increased load against the movable plate 44, and the counter weights are so adjusted on the arms 52 that whenever this condition exists the weight of the material against the plate 44 will cause it to swing to its "open" position as shown in FIG. 4. At this time, the material 30 will feed through the entire length of the "gate" which is thus opened by movement of the plate 44, so that the material will spill over at the same thickness throughout the entire extent of the gate from the right hand end to the left hand end of the machine. However, whenever the material fed into the machine decreases so that material no longer flows through the gate opening beyond the left hand end portion 62 of the fixed plate 28, the pressure against the movable plate 44 thereupon decreases automatically to such an extent that the counter-weight devices operate to return the movable gate 44 to a closed position so as to shut off the flow of material over the spill plate 38 throughout the entire length of the gate device.

To effect separation of the reusable abrasive particles from the relatively finer size unusable abrasive particles and/or fine debris such as may have been picked up from previous operations as explained hereinabove, a stream of air is arranged to be conducted through the machine, as through an inlet opening indicated at 70 (FIG. 2) and thence through the curtain and down-falling material from the lip plate 38. The air gap is further defined by a positionally adjustable bottom ledge plate 72 (FIG. 2); a downwardly extending baffle plate 74, and then an upwardly directed outlet duct as indicated at 75. Thus by virtue of this arrangement the curtain of material falling from the spill plate 38 is subjected to an air separation process which permits only the relatively coarser and heavier reusable abrasive particles to fall as indicated at 76 (FIG. 4) downwardly into a chute 78 (FIG. 2) for transport to a subsequent shot-blasting operation as explained hereinabove; while the relatively fine materials driven out of the curtain of spilling material by the flow of air therethrough will fall as indicated at 79 (FIG. 4) into a hopper device 80 (FIG. 2) for subsequent disposal as waste material.

Thus it will be appreciated that it is a particular feature of the present invention that whereas the rate of material feed may vary from time to time, regardless thereof the gate plate 44 will under no condition open so as to permit a curtain of material to spill therefrom without insuring at the same time that the curtain of spilling material is of uniform thickness throughout the length of the air gap between the spill plate 38 and the ledge plate 72. This in turn insures that the air separation action throughout the entire extent of the air gap is uniformly performed, because the absence of relatively "thick" and "thin" areas in the curtain of spilling material will insure uniform air velocities through all portions of the curtain.

Although only one form of the invention has been shown and illustrated in detail herein it will of course be understood that various changes may be made without departing from the spirit of the invention or the scope of the appended claims.

I claim:

1. A particulate material separation device comprising, a casing, a revolving cylindrical screen disposed within said casing, a material feed inlet device delivering into one end of said screen, a hopper device disposed beneath said screen and having a gravity discharge opening therefrom extending in the longitudinal direction of said screen, a fixed gate plate disposed along said opening and extending to the feed inlet end thereof but stopping short of the opposite end thereof to provide a controlled material passage gap therebelow and a free-flow material passage gap therebeyond, a movable control plate hingedly mounted parallel to said fixed gate plate and counter-weighted to oppose and remain closed against the weight of material moving thereagainst from below said fixed gate plate while opening in response to the added weight of material moving thereagainst through the free-flow gap portion of the device, means for leveling material passing through said screen so as to be substantially even within said hopper device, along the length of said control plate, and means projecting a stream of air through the curtain of material released by opening of said movable control plate.

2. A particulate material separation device comprising, a screen having an elongate material passage path, a material feed inlet device delivering a said screen, a hopper device disposed beneath said screen and having an elongate gravity discharge opening therefrom extending parallel to said material passage path, a fixed gate plate disposed adjacent said opening and extending to the feed inlet end thereof but stopping short of the opposite end thereof to provide a controlled material passage gap therebelow and a free-flow material passage gap therebeyond, a movable control plate hingedly mounted parallel to said fixed gate plate and counter-weighted to oppose and remain closed against the weight of material moving thereagainst from below said fixed gate plate while opening in response to the added weight of material moving thereagainst through the free-flow gap portion of the device, means for leveling material passing through said screen so as to be substantially even within said hopper device, along the length of said control plate, and means directing a stream of air to pass through the curtain of material released by opening of said movable control plate.

3. A particulate material separation device comprising, a material feed device delivering material along an extended path, a hopper device disposed beneath said path and having an elongate discharge opening parallel thereto, a positionally adjustable gate plate disposed to restrict said opening and extending to the feed inlet end thereof but stopping short of the opposite end thereof to provide a controlled material passage gap therebelow and a free-flow material passage gap therebeyond, a movable control plate hingedly mounted adjacent said gate plate and counter-weighted to oppose and remain closed against the weight of material moving thereagainst from below said gate plate while opening in response to the added weight of material moving thereagainst through the free-flow gap portion of the device, means for leveling material passing through said screen so as to be substantially even within said hopper device, along the length of said control plate, and means projecting a stream of air through the curtain of material released by opening of said movable control plate.

4. A particulate material separation device comprising, a casing, a revolving cylindrical screen disposed within said casing, a material feed inlet device delivering into one end of said screen, a hopper device disposed beneath said screen and having a gravity discharge opening therefrom extending parallel to said screen, an adjustable gate plate fixed adjacent said opening and extending to the feed inlet end thereof but stopping short of the opposite end thereof to provide a controlled material passage flow gap therebelow and a free-flow material passage gap therebeyond, a movable control plate hingedly mounted parallel to said fixed gate plate and counter-weighted to oppose and remain closed against the weight of material moving thereagainst from below said fixed gate plate while opening in response to the added weight of material moving thereagainst through the free-flow gap portion of the device, means for leveling material passing through said screen so as to be substantially even within said hopper device, along the length of said control plate, and means directing a stream of air to pass through the curtain of material released by opening of said movable control plate.

5. A particulate material separation device comprising, a casing, a revolving cylindrical screen disposed within said casing, conveyor flights carried by said screen interiorly thereof to displace feed material from the feed end to the discharge end thereof, a material feed inlet device delivering into one end of said screen, a hopper device disposed beneath said screen and having a gravity discharge opening therefrom extending in the longitudinal direction of said screen, a fixed gate plate disposed along said opening and extending to the feed inlet end thereof but stopping short of the opposite end thereof to provide a controlled material passage gap therebelow and a free-flow material passage gap therebeyond, a movable control plate hingedly mounted parallel to said fixed gate plate and counter-weighted to oppose and remain closed against the weight of material moving thereagainst from below said fixed gate plate while opening in response to the added weight of material moving thereagainst through the free-flow gap portion of the device, means for leveling material passing through said screen so as to be substantially even within said hopper device, along the length of said control plate, and means projecting a stream of air through the curtain of material released by opening of said movable control plate.

6. A particulate material separation device comprising, a casing, a revolving cylindrical screen disposed within said casing, a helical conveyor flight mounted exteriorly of said screen, a material feed inlet device delivering into one end of said screen, a hopper device disposed beneath said screen to receive feed material spread therein by said screen conveyor flight and having a gravity discharge opening therefrom extending parallel to said screen, an adjustable gate plate fixed adjacent said opening and extending to the feed inlet end thereof but stopping short of the opposite end thereof to provide a controlled material passage flow gap therebelow and a free-flow material passage gap therebeyond, a movable control plate hingedly mounted parallel to said fixed gate plate and counter-weighted to oppose and remain closed against the weight of material moving thereagainst from below said fixed gate plate while opening in response to the added weight of material moving thereagainst through the free-flow gap portion of the device, and means directing a stream of air to pass through the curtain of material released by opening of said movable control plate.

7. A particulate material separation device comprising, an elongate hopper device having an elongate gravity discharge opening therefrom, means distributing feed material from one end lengthwise of said hopper device, a fixed gate plate disposed adjacent said opening and extending to the feed inlet end thereof but stopping short of the opposite end thereof to provide a controlled material passage gap therebelow and a free-flow material passage gap therebeyond, a movable control plate hingedly mounted parallel to said fixed gate plate and counter-weighted to oppose and remain closed against the weight of material moving thereagainst from below said fixed gate plate while opening in response to the added weight of material moving thereagainst through the free-flow gap portion of the device, and means directing a stream of air to pass through the curtain of material released by opening of said movable control plate.

8. A particulate material separation device comprising, a hopper device having an elongate gravity discharge opening therefrom, means distributing feed material to said hopper device lengthwise of said discharge opening, a fixed gate plate disposed adjacent said opening and extending from one end thereof but stopping short of the opposite end thereof to provide a controlled material passage gap therebelow and a free-flow material passage gap therebeyond, a movable control plate hingedly mounted parallel to said fixed gate plate and counter-weighted to oppose and remain closed against the weight of material moving thereagainst from below said fixed gate plate while opening in response to the added weight of material moving thereagainst through the free-flow gap portion of the device, and means directing a stream of air to pass through the curtain of material released by opening of said movable control plate.

9. A particulate material separation device comprising, a casing presenting a hopper device having an elongate gravity discharge opening, a fixed gate plate disposed along said opening and extending from one end thereof but terminating short of the opposite end thereof to provide a controlled material passage gap therebelow and a free-flow material passage gap therebeyond, a movable control plate hingedly mounted parallel to said fixed gate plate and being of a length substantially corresponding to the length of said discharge opening so as to thereby exceed the length of said fixed gate plate, means distributing feed material within said hopper device lengthwise of said gravity discharge opening and including mechanism for establishing a substantially uniform level of feed material within said hopper device, counterweight means on said movable control plate constraining said control plate to remain closed against the weight of material moving thereagainst from below said fixed gate plate only while opening in response to the added weight of material moving thereagainst through the free-flow gap portion of the device, and means projecting a stream of air through the curtain of material released by opening of said movable control plate.

10. A particulate material separation device comprising an elongate hopper device having an elongate gravity discharge opening, a fixed gate plate disposed adjacent said opening and being of a length less than the length of said discharge opening to provide a controlled material passage gap below the gate plate and a free-flow material passage gap beyond such gate plate, a movable control plate hingedly mounted parallel to said fixed gate plate and counterweighted to oppose and remain closed against the weight of material moving thereagainst from below said fixed gate plate while opening in response to the added weight of material moving thereagainst through the free-flow gap portion of the device, means distributing feed material to said hopper device substantially uniformly therewithin along the length of said discharge opening, and means directing a stream of air to pass through the curtain of material released by opening of said movable control plate.

References Cited in the file of this patent

UNITED STATES PATENTS

| | | |
|---|---|---|
| 750,092 | Cornwall | Jan. 19, 1904 |
| 1,506,494 | Lindsay | Aug. 26, 1924 |
| 2,866,547 | Gladfelter | Dec. 30, 1958 |